US012177616B2

(12) United States Patent
O'Donnell et al.

(10) Patent No.: US 12,177,616 B2
(45) Date of Patent: Dec. 24, 2024

(54) MARINE SPEAKER BOX ASSEMBLY

(71) Applicants: Kevin O'Donnell, Forest Lake, MN (US); Vincent Cornelis Linders, Arden Hills, MN (US)

(72) Inventors: Kevin O'Donnell, Forest Lake, MN (US); Vincent Cornelis Linders, Arden Hills, MN (US)

( * ) Notice: Subject to any disclaimer, the term of this patent is extended or adjusted under 35 U.S.C. 154(b) by 162 days.

(21) Appl. No.: 17/880,170

(22) Filed: Aug. 3, 2022

(65) Prior Publication Data

US 2024/0048881 A1 Feb. 8, 2024

(51) Int. Cl.
*H04R 1/02* (2006.01)

(52) U.S. Cl.
CPC .................................... *H04R 1/025* (2013.01)

(58) Field of Classification Search
CPC ...................................................... H04R 1/025
See application file for complete search history.

(56) References Cited

U.S. PATENT DOCUMENTS

| | | | | |
|---|---|---|---|---|
| 11,223,886 | B1 * | 1/2022 | Fadul | H04R 1/023 |
| 11,601,737 | B1 * | 3/2023 | Ivey | H04R 1/021 |
| 2019/0193612 | A1 * | 6/2019 | Oswald | B60R 11/0217 |
| 2022/0038800 | A1 * | 2/2022 | Prendergast | G10H 1/32 |
| 2023/0001861 | A1 * | 1/2023 | Fay | H04R 1/025 |

* cited by examiner

*Primary Examiner* — Suhan Ni
(74) *Attorney, Agent, or Firm* — WESTMAN CHAMPLIN & KOEHLER, P.A.; Amanda M. Prose

(57) ABSTRACT

A speaker box assembly for mounting on a watercraft with a housing having a length and comprising a top, bottom, and front wall, wherein the front wall of the housing has a plurality of openings spaced apart along the length thereof. Each opening is configured for mounting a speaker therein. An interior cavity is configured to support a speaker body therein. The speaker box assembly is configured with at least one mounting surface which may be on a top or bottom wall and the mounting surface has at least one aperture therein for installing the speaker box in connection with an external surface of the watercraft using a fastener inserted through the aperture and connecting with the watercraft.

7 Claims, 8 Drawing Sheets

MARINE SPEAKER BOX ASSEMBLY

BACKGROUND

The present invention relates to a marine speaker box integrated with a plurality of speakers for increasing sound coverage area.

Typically, a boat only has one speaker positioned near the driver's seat and users positioned closest to the speaker hear the sound output at a high volume while users positioned further away, e.g., in the water, cannot hear the sound output.

SUMMARY

An aspect of the present disclosure relates to a speaker box assembly for mounting on a watercraft. The assembly has a housing having a length and comprising a top, bottom, and front wall, wherein the front wall of the housing comprises a plurality of openings spaced apart along the length thereof, and wherein each opening is configured for mounting a speaker therein; and an interior cavity configured to support a speaker body therein. The speaker box assembly is configured with at least one mounting surface which may be on a top or bottom wall, the mounting surface having at least one aperture therein for installing the speaker box in connection with an external surface of the watercraft using a fastener inserted through the aperture and connecting with the watercraft.

A back side of the housing is open for securing the housing to the external surface of the watercraft such that the external surface of the watercraft provides a back wall to enclose the open cavity of the housing and the speaker bodies therein.

The housing is made of aluminum.

The housing further comprises at least one foldable end section to provide side walls on one or both opposing ends of the length of the housing.

The housing comprises twelve openings in the front face for supporting twelve speakers therein.

The housing is modular in construction and comprises four openings in the front face.

A plurality of housings are connectable end to end for custom installation of a speaker box assembly supporting more than four speakers.

Another aspect of the present disclosure relates to a speaker box module assembly comprising a first end module having an interior cavity and front face configured with a plurality of openings for receiving a plurality of speakers therein and supporting thereon and a first end of the first end module being a notched end and a second, opposing end of the module being unnotched; one or more length extending modules, each one of length extending modules having an interior cavity and front face configured with a plurality of openings for receiving a plurality of speakers therein and supporting thereon and a first end of the length extending modules being unnotched end and a second, opposing end of the length extending module also being unnotched; and a second end module having an interior cavity and front face configured with a plurality of openings for receiving a plurality of speakers therein and supporting thereon and a first end of the second end module being an unnotched end and a second, opposing end of the second end module being a notched end. Unnotched ends of the first end and second end modules are installed directly adjacent to the respect unnotched ends of the at least one length extending module installed between the first end module and the second end module and wherein the notched first end of the first end module and the notched second end of the second end module provide terminal ends to the speaker box module assembly.

The assembly is installed on an exterior surface of a boat.

Each module has a length and comprises a top and bottom wall in addition to the front face, wherein the front wall of the housing comprises a plurality of openings spaced apart along the length thereof, and wherein each opening is configured for mounting a speaker therein.

The assembly supports at least four speakers or twelve or more speakers on a hull of the boat.

A top wall of each module further comprises at least one mounting aperture for securing the module to a boat.

The notched ends are foldable ends for closing terminal ends of the module.

The assembly further comprises one or more connectors which are coupled to ends of two adjacent modules for coupling said modules together in a manner that allows ends of each module to abut one another when connected.

DETAILED DESCRIPTION

Figure 1:
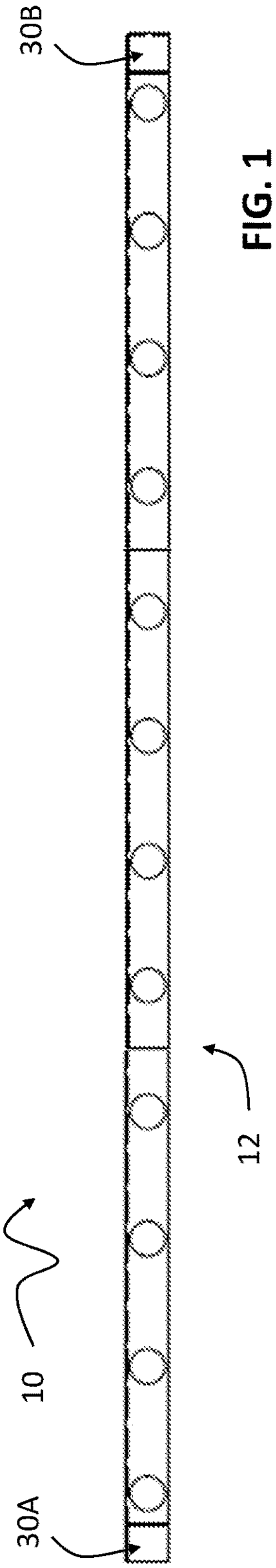
FIG. 1 is a front view of a speaker box assembly.
Figure 2:
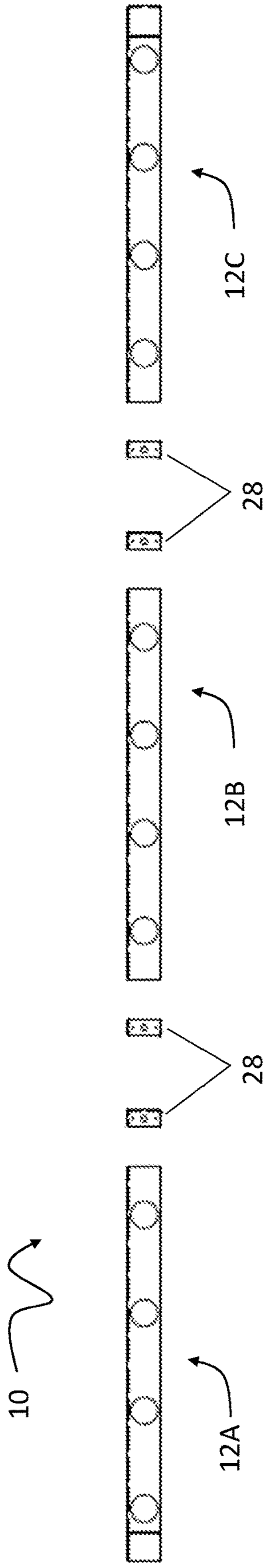
FIG. 2 is an exploded view of the speaker box assembly.
Figure 3A:
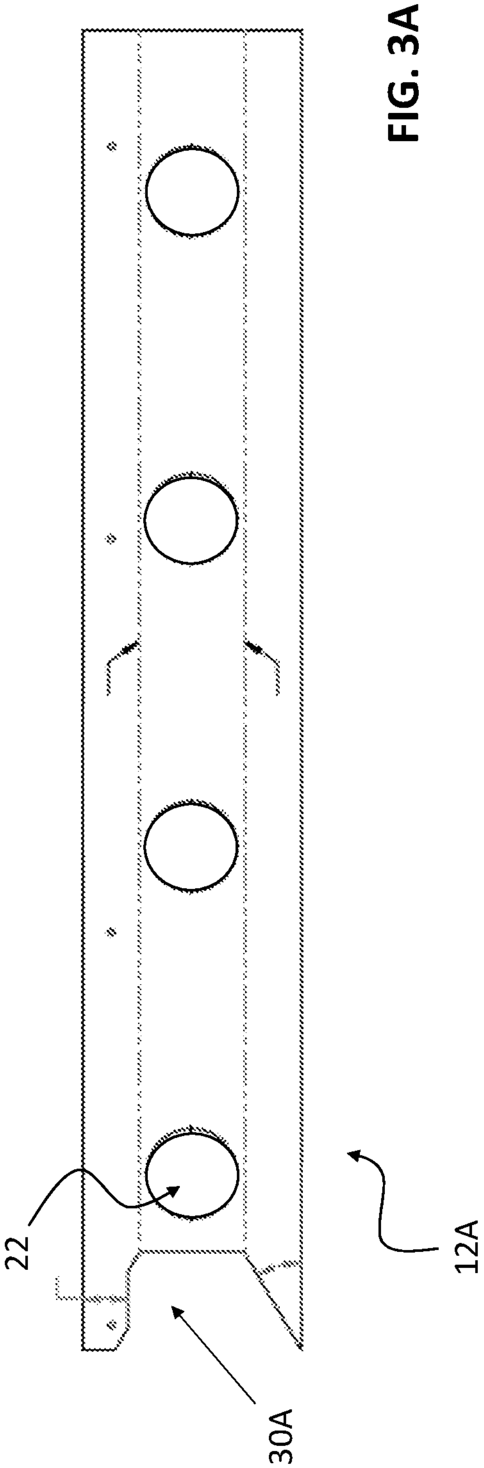
FIG. 3A is a front view of a flat plate for forming a first module of a speaker box assembly.
Figure 3B:
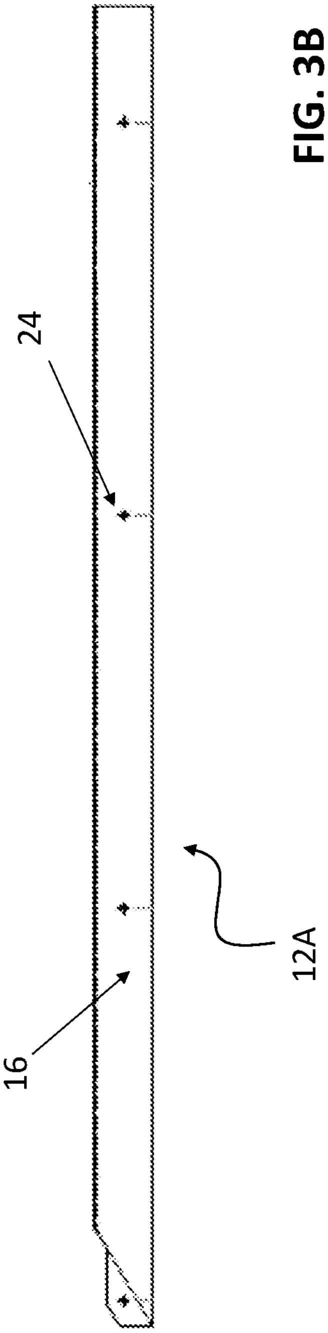
FIG. 3B is a top view of the first module of the speaker box assembled from the flat plate illustrated in FIG. 3A.
Figure 3C:
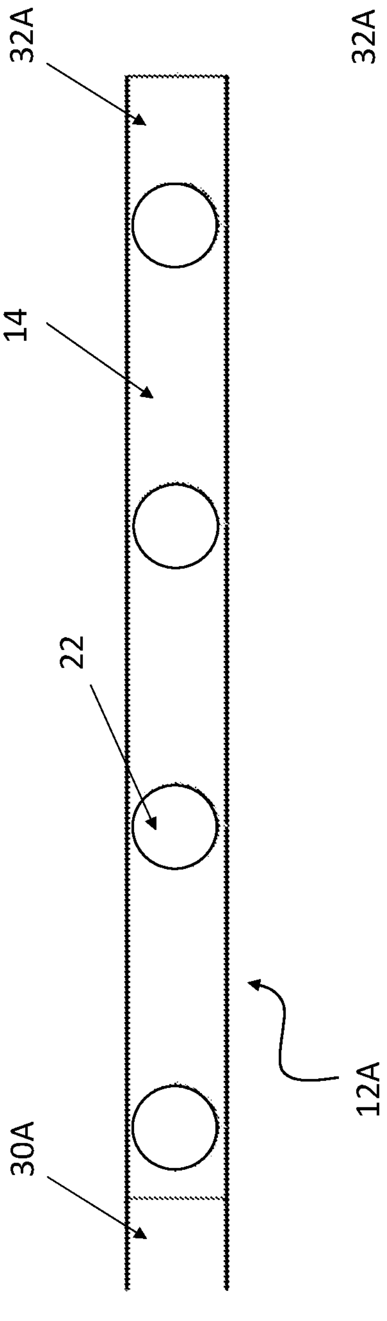
FIG. 3C is a front view of the first module of the speaker box assembled from the flat plate illustrated in FIG. 3A.
Figure 3D:
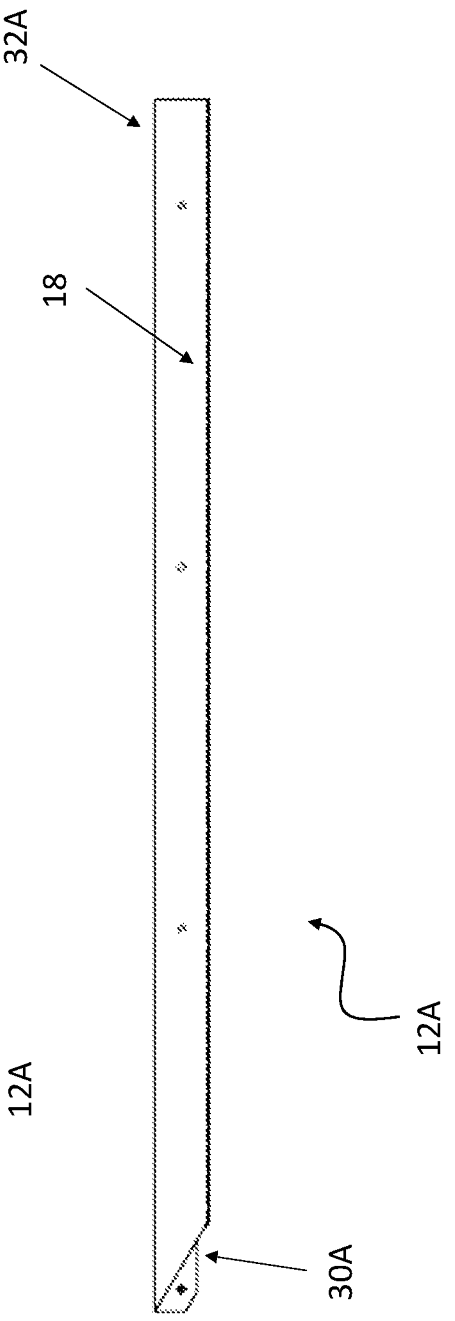
FIG. 3D is a bottom view of the first module of the speaker box assembled from the flat plate illustrated in FIG. 3A.
Figure 4A:
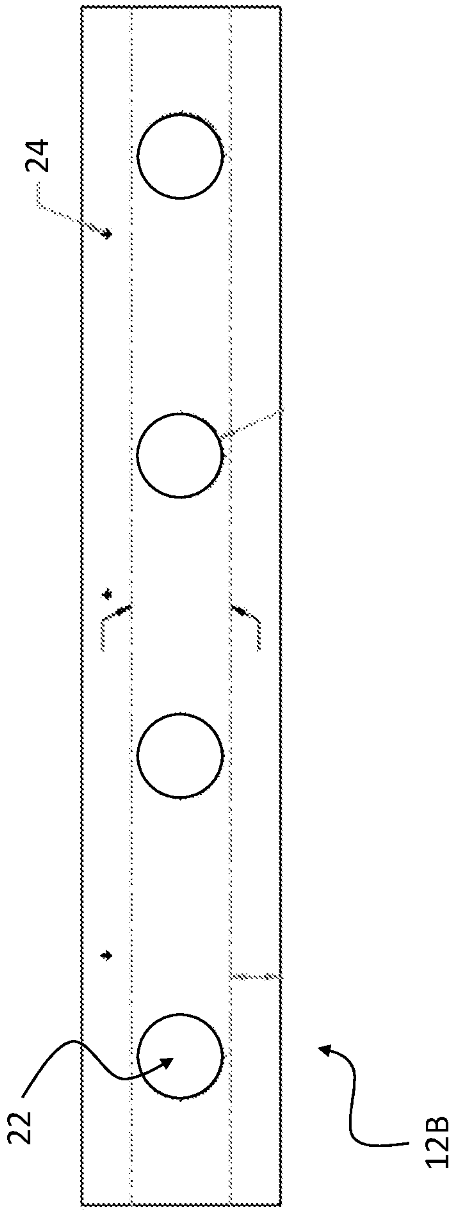
FIG. 4A is a front view of a flat plate for forming a second module of a speaker box assembly.
Figure 4B:
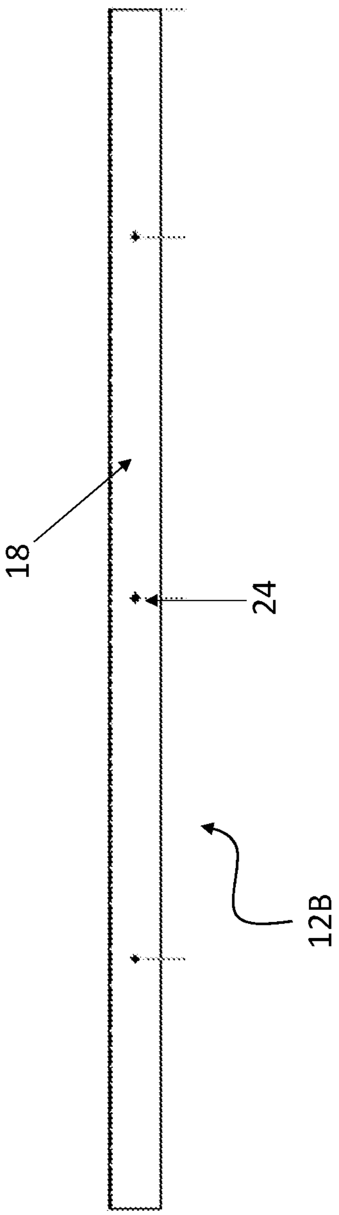
FIG. 4B is a top view of the second module of the speaker box assembled from the flat plate illustrated in FIG. 4A.
Figure 4C:
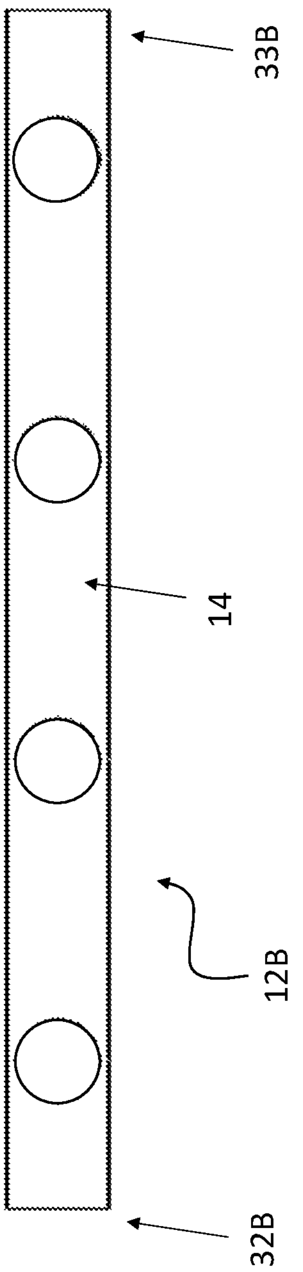
FIG. 4C is a front view of the second module of the speaker box assembled from the flat plate illustrated in FIG. 4A.
Figure 4D:
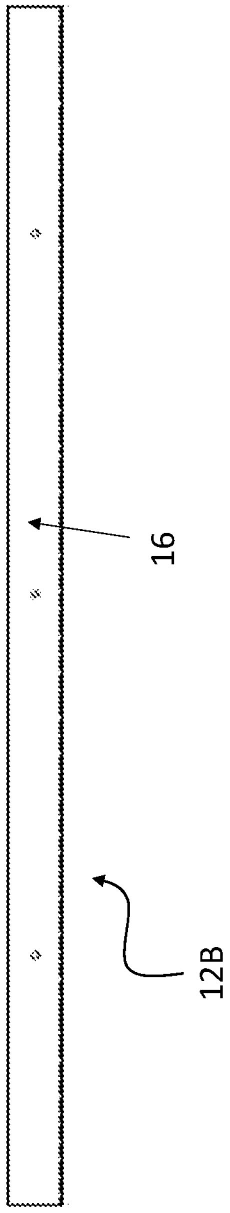
FIG. 4D is a bottom view of the second or subsequent module of the speaker box assembled from the flat plate illustrated in FIG. 4A.
Figure 5A:
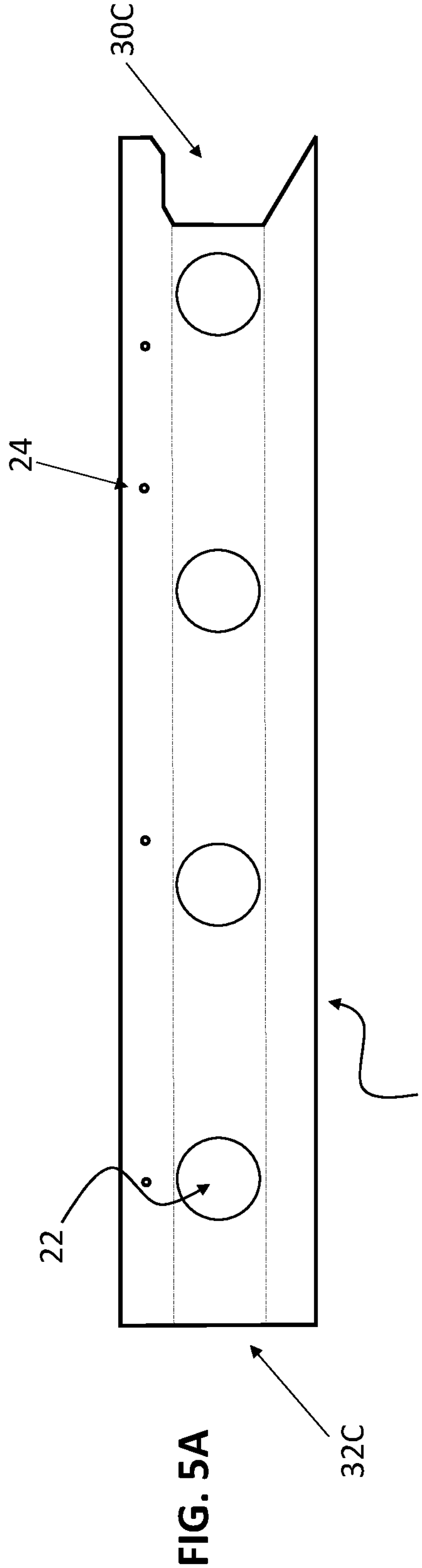
FIG. 5A is a front view of a flat plate for forming a third or subsequent module of a speaker box assembly.
Figure 5B:
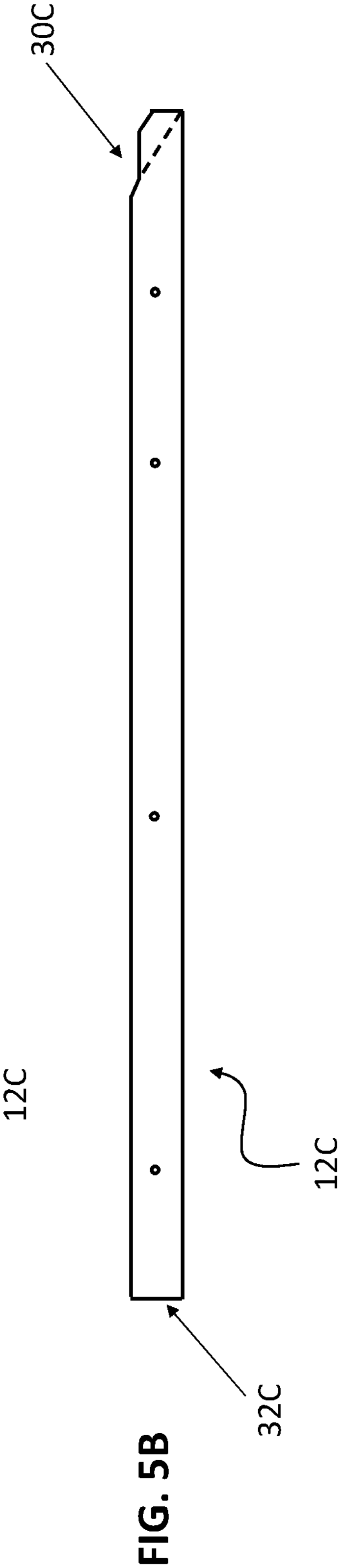
FIG. 5B is a top view of the third or subsequent module of the speaker box assembled from the flat plate illustrated in FIG. 5A.
Figure 5C:
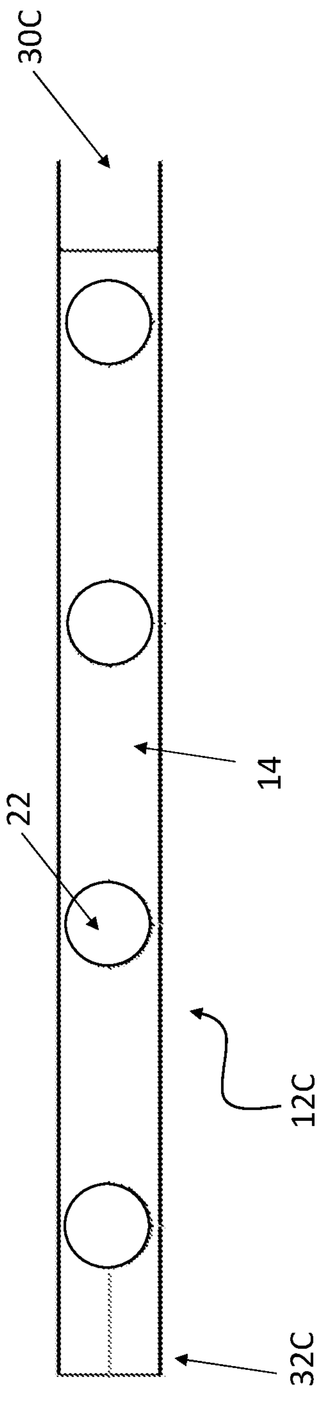
FIG. 5C is a front view of the third or subsequent module of the speaker box assembled from the flat plate illustrated in FIG. 5A.
Figure 5D:
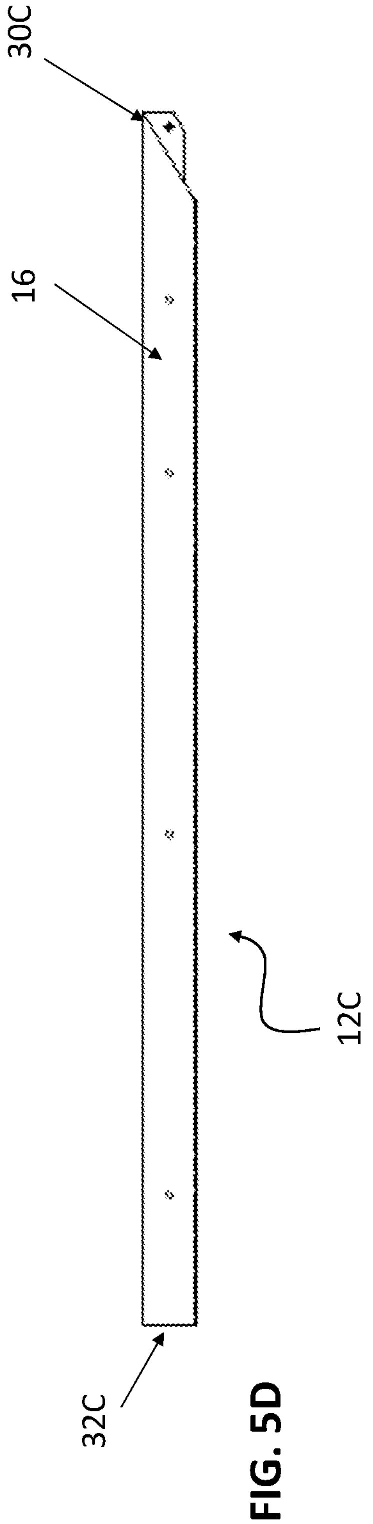
FIG. 5D is a bottom view of the third or subsequent module of the speaker box assembled from the flat plate illustrated in FIG. 5A.

Described herein is a speaker box for installation on an external or outer surface of a watercraft. The speaker box supports a plurality of spaced apart speakers which allows a user to increase an area with audial access to the speaker output and/or customize installation for the user's specific boat or other watercraft. The speaker box can be installed on an exterior surface of the watercraft, for example, along an outer surface of the water craft such as a location on a hull or deck of the boat. Installation can include removably coupling the speaker box to preexisting rails or body features of the watercraft. While the description herein refers to installation of one or more speaker boxes on various types of watercraft, it is also contemplated and within the scope of the disclosure that the speaker boxes be mounted to any mobile or stationary location with access to a power source and audio transmitter. For example, the boxes may be installed along a dock surface or other marine structure as well as on mobile structures or vehicles such as recreational vehicles or campers.

A speaker box according to one or more embodiments described herein comprises a housing with a plurality of openings therein. The housing has an interior cavity for supporting operational components of the plurality of speakers and associated wiring within the housing such that each opening exposes at least the gasket face of the speaker for allowing sound waves to emanate from the speaker without interference from a surface of the housing. The speaker box has openings configured to receive standard size small speakers therein. This allows the speaker box to provide an increased sound area without increasing the size of the speaker(s). The speaker box can be described as a housing with a front side, top side, bottom side and open back side. It is contemplated that the back side may also have a wall for mounting the speaker box. However, the construction of the speaker box is configured to nest a plurality of speakers therein and mount the assembly to a watercraft. Locations, types and sizes of mounting locations may vary depending on the specific make or model or other location to which the speaker box is mounted. The speaker box assembly according to one or more embodiments herein is an aftermarket assembly for installation on a factory model watercraft. However, it is within the scope of the present disclosure that the assembly may be provided on a watercraft at manufacture.

The speaker box may be made of a material that can withstand outdoor exposure, including water exposure. Gaskets or other seals may be provided in the openings with the speakers to provide a waterproof or leakproof seal where the speakers are mounted in the speaker box. As the speaker boxes may be mounted on a surface of a boat that is generally above the water line, the speaker boxes may be exposed to splashing. The boxes may be made of a metal, such as aluminum or titanium, as well as other materials such as hard plastics. In general, a speaker box may be provided in custom lengths ranging from about 5 to 25 feet or longer and multiple speaker box modules may be installed in an environment for increased coverage, such as speaker boxes installed on both port and starboard sides of a boat. In one embodiment, the speaker box may be in the range of about 18-21 feet long, and for a pontoon style boat, the speaker box may be provided in a 20 foot length.

The speaker box described herein allows a user to project sound to users outside of a boat when the boat is stationary, such as users swimming outside of a boat, while also providing surround sound to users inside the boat. The speaker housing allows a sound output to reach a greater area at a substantially equal volume to each area. This allows multiple users to enjoy the same volume of sound output, regardless of where they are positioned with respect to a boat. Additionally, as the speaker boxes may be modular in construction, the speaker boxes can be installed in various custom configurations which may be selected depending on the installation location size, use, and configuration as well as a total number of speakers that are desired.

The speakers provided with the speaker box may be connectable to a power source via wired or wireless connection. Components for power and power source connection may be received inside a cavity in the speaker box and an outlet aperture provided in one or more walls or sides of the speaker box for connecting the speakers to a boat power source via wired connection. The speakers may be connected in parallel or series to the same audio source for synched sound emission.

In further detail as illustrated in FIG. 1, a speaker box assembly 10 is a housing 12 that may be a generally rectangular box comprising three sides 14, 16, 18. A front side 14 faces outwardly and away from an installation surface 20 on which the assembly 10 is mounted. For example, if the installation surface 20 is provided on a boat, the front side 14 faces away from the boat. A bottom side 16 of the housing 12 faces downwardly toward the ground and/or water when the front side 14 is facing outward. A top side 18 then faces upwardly when the front side 14 is facing outwardly. The bottom side 16 and the top side 18 extend away from upper and lower edges of the front side 14 to provide a cavity within the housing 12 for speaker components and wiring. In the embodiment illustrated, the top side 18 and bottom side 16 are positioned to extend from the front side 14 at approximately ninety-degree angles. The front side 14 hosts a plurality of apertures or speaker opening 22 therein and spaced along a length thereof. Each speaker opening is configured to support a corresponding speaker mounted therein and thus supported in the speaker box assembly 10.

The installation surface 20 may be provided on any object where an increased sound field is desired without increasing a side and amperage of the speaker itself. That is, a speaker box housing 12 supports a plurality of speakers therein, where each speaker is a small speaker but provides a sound output field of greater coverage. A speaker box assembly 10 may comprise one or more speaker box housings 12 as described in further detail below. The speaker box assembly 10 may be mounted on a wall, boat, dock, or trailer. Additionally, the speaker box assembly 10 can be positioned to rest on a shelf and/or inside a cubbyhole.

Figure 6:
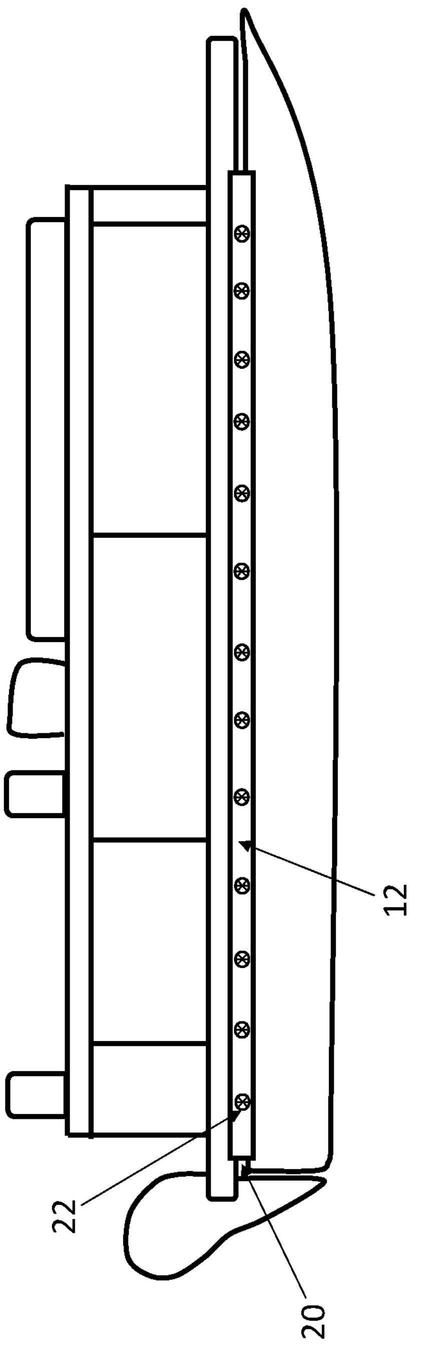
FIG. 6 illustrates a module assembly installed on an external surface of a watercraft.

For securing the speaker box assembly to the installation surface 20, installation apertures or holes may be provided in one or more sides of the speaker box housing 12. Referring to FIGS. 1-5D, the top side 18 may have a plurality of attachment apertures 24 that may be used for securing the speaker box housing 12 to the installation surface 20. The top side 18 of one or more speaker boxes may be securable to a boat such that the assembly 10 is mounted to the exterior deck frame section or hull of the boat. Screws, bolts, or other fasteners may be used to secure the housing 12 via the attachment apertures 24. For example, the top side 18 can attach below the bottom and/or over the top of a protruding edge on the outer side of the boat such that the speaker box assembly 10 fits along the length of the boat without being submerged underwater as shown in FIG. 6.

In one or more embodiments, and as shown in further detail in FIGS. 3A-5D, the speaker box assembly 10 may be a modular assembly to accommodate a desired or preselected housing length and number of speakers. In the embodiment illustrated in FIGS. 3A-5D, the speaker box assembly 10 comprises three modules including a first end module 12A, a center or length extending module 12B, and a second, opposing end module 12C. The modules 12A, 12B, 12C may be connected by one or more connectors 28 and each module 12A, 12B, 12C comprises a plurality of apertures or speaker openings 22, for example, four speaker openings 22 along its length.

In one installation, the first module 12A may be a first terminal end module, connectable to a center module 12B. The first module 12A may have opposing ends of different construction in that a first end 30 of the first end module 12A closes or substantially on one side, such that no additional modules may be added to the closed end 30 of the first module 12A. This closed end 30 may have an opening formed for pass through of wiring. A second, opposing end 32 of the first end module 12A is then open for connection to a subsequent module housing 12 which may be either a center module 12B or an opposing end module 12C. The first end module 12A may be, for example, about 6 to about 8 feet long and may have two, three, four or more speaker openings 22 spaced apart along its length. The first end module 12A may have the overall construction of housing 12 such that the module has three sides including a front side, bottom side 16 and top side 18. Any side, for example the top side 18 may include one or a plurality of attachment apertures 24 at one or more points along its length. The attachment apertures 24 may be equally spaced or variably spaced apart.

As illustrated in FIGS. 3A-3D, the first end module 12A may be formed from a flat sheet of substrate prepared via laser cutting, pressing or punching, or similar processes. The flat sheet is then formed via a series of bends into the housing 12A for installation. As the modules may be machined from a flat plate of material and folded along indicated lines to assemble a unitary module that is mountable flush with or otherwise abuts an installation surface. This helps to enclose the assembly against the installation surface to prevent water, bugs, and other material from accumulating inside the speaker box housing. In one embodiment, the first end 30 is a notched or folded end and the second opposing end 32 is a blunt end. The notched or folded end 30 may include an elongated portion 34 that may have an optional aperture 36 therein. The notched or folded end 30 may be the terminal end for the modular assembly and when folded to substantially close the end of housing 12A with an opening in the side wall for wiring and power access. The blunt end 32, however, is connectable to a connector 28 for securing the first end module 12A to a first end of a second module 12B, 12C. In the embodiment illustrated in FIGS. 4A-4D, the subsequent module 12B is a center module 12 having opposed blunt ends 32A, 33B that are both blunt. Another connector 28 then is inserted to couple the opposing end 33B of the center module 12B to either another center module 12B or the second end module 12C. The connectors 28 allows the first end module 12A and second end module 12C to be connected to one another directly for a shorter modular assembly or to one or more center modules 12B to selectively extend the length of the modular assembly.

As illustrated in FIGS. 5A-5D, the second end module 12C is constructed with a first blunt end 30C and the second opposing end 32C is a notched or folded end. Thus, the blunt ends 32, 32C of the first module 12A and second module 12C are provided along the length of the assembly extending therebetween while the notched or folded ends 30A, 30C of each of the first module and second module form the opposing terminal ends of the assembly 10, regardless of the number of center modules 12B connected therebetween.

In one embodiment, the speaker openings 22 in the front face 16 of the speaker housing 12 are spaced apart in the range of 12 to 24 inches measured from a center point of each adjacent speaker opening. The speaker opening 22 closest to the blunt end 32A, 32B, 33B, 32C of each module 12A, 12B, 12C may be positioned approximately half the distance between speaker openings 22 on the same module from the blunt end so that when modules are connected the distance between speaker openings is approximately equal.

The center module 12B is constructed similarly to the first end module 12A and second end module 12B, but for being provided with two opposing blunt ends 32B, 33B and no notched or folded end. Each blunt end 32B, 33B is configured to fit or receive connectors 28 so that additional modules 12A, 12B, 12C can be attached on each end of the center module 12B. The modules 12, 12B, 12C may have similar dimensions such that when assembled to the selected length and speaker capacity, the module provides the appearance of a unitary assembly and the modules are flush and/or abutted at the respective blunt edges to substantially enclose the speaker housing modular assembly. The connectors 28 abut the ends of the modules in a flush manner and may be coupled to the modules via fasteners and/or friction fitting.

It is also noted that the modules may have differing lengths but a same height and depth for further customizing the assembly. Each module similarly is provided with one or more installation apertures 24 on one or more surfaces for securing the module directly to the boat or other installation surface.

The speaker openings 22 as illustrated in the figures can vary in size and shape. For example, the speaker openings can be measured to fit a specific type of speaker. In another example, the speaker openings can have a diameter of 5.5 inches. The speaker openings in a speaker box housing may all be the same size and shape or the size and shape may differ within the same speaker box housing. Various speaker openings 22 can be positioned along the length of a speaker box housing 12. Additionally, different configurations may be used, for example, a speaker opening could be positioned above or diagonal to another speaker opening.

The connectors 28 connect modules together to create a modular speaker box assembly 10 with a plurality of modules 12. This allows the speaker box housing to be customizable to a desired length for the user. The connectors 28 may be rectangular housings with one or more apertures therein and having dimensions that allow the connectors to couple to and/or at least partially within the end interior cavities of two adjacent modules to allow for flush and continuous mounting of adjacent modules in a manner which encloses the assembly 10 comprised of multiple modules 12. The connector 28 fits on the blunt end of a module 12. The connectors also have an opening for pass through of wiring for the speakers.

Furthermore, an end cap 109 may be added to the notched or folded end of a module to substantially close the end of the speaker box assembly.

Although the present disclosure has been described with reference to preferred embodiments, workers skilled in the art will recognize that changes may be made in form and detail without departing from the spirit and scope of the disclosure.

The invention claimed is:

1. A speaker box assembly for mounting on a watercraft, the assembly comprising:

a housing having a length and comprising a top, bottom, and front wall, wherein the front wall of the housing comprises a plurality of openings spaced apart along the length thereof, and wherein each opening is configured for mounting a speaker therein; and an interior cavity configured to support a speaker body therein, wherein the speaker box assembly is configured with at least one mounting surface on a top or bottom wall, the mounting surface having at least one aperture for installing the speaker box to an external surface of the watercraft using a fastener inserted through the aperture, wherein the housing is modular in construction, and wherein a plurality of the housings, each having a plurality of openings, are connected end to end forming a custom installation of the speaker box assembly, the assembly comprising more than four openings along the front face thereof and supporting more than four speakers therein.

2. The assembly of claim 1, wherein a back side of the housing is open for securing the housing to the external surface of the watercraft such that the external surface of the watercraft provides a back wall to enclose the open cavity of the housing and the speaker bodies therein.

3. The assembly of claim 1, wherein the housing is made of aluminum.

4. The assembly of claim 1 wherein the housing further comprises at least one end section to provide a side wall on at least one end of the length of the housing.

5. The assembly of claim 1 wherein the housing comprises four or more openings in the front face for supporting four or more speakers therein.

6. The assembly of claim 1 wherein the assembly comprises twelve openings along the front face.

7. The assembly of claim 1 and further comprising one or more connectors which are coupled to two adjacent housings to secure the housings together.

* * * * *